US008760028B2

(12) United States Patent
Nakahara et al.

(10) Patent No.: US 8,760,028 B2
(45) Date of Patent: Jun. 24, 2014

(54) ELECTRICAL ROTATING MACHINE WITH LOCAL HEAT REDUCTION

(75) Inventors: Akihito Nakahara, Hitachi (JP);
Kazuhiko Takahashi, Hitachi (JP);
Kazumasa Ide, Hitachioota (JP); Junya Kaneda, Hitachi (JP); Kenichi Hattori, Hitachi (JP); Takashi Watanabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1719 days.

(21) Appl. No.: 11/194,919

(22) Filed: Jul. 29, 2005

(65) Prior Publication Data

US 2006/0043820 A1    Mar. 2, 2006

(30) Foreign Application Priority Data

Sep. 1, 2004  (JP) ................. 2004-253711

(51) Int. Cl.
*H02K 1/02* (2006.01)
*H02K 1/16* (2006.01)

(52) U.S. Cl.
USPC ....... 310/216.016; 310/216.006; 310/216.008

(58) Field of Classification Search
USPC ...................... 310/58, 59, 216, 254
See application file for complete search history.

(56) References Cited

U.S. PATENT DOCUMENTS

| 1,367,298 A | * | 2/1921 | Burke ............................ 318/244 |
| 2,774,000 A | * | 12/1956 | Ross ............................. 310/216 |
| 3,812,392 A | * | 5/1974 | Barton et al. ................ 310/259 |
| 4,609,840 A | * | 9/1986 | Eats et al. ..................... 310/58 |
| 4,672,252 A | * | 6/1987 | Spirk ............................ 310/216 |
| 6,525,444 B2 | * | 2/2003 | Salem et al. .................. 310/216 |
| 7,057,324 B2 | * | 6/2006 | Breznak et al. ............... 310/216 |
| 2004/0119365 A1 | | 6/2004 | Breznak et al. |

FOREIGN PATENT DOCUMENTS

| FR | 1588684 A | | 4/1970 | |
| JP | 61062334 A | * | 3/1986 | ............... H02K 1/20 |
| JP | 63-217940 | | 9/1988 | |
| JP | 63277438 A | * | 11/1988 | ............... H02K 1/06 |
| JP | 05184088 A | | 7/1993 | |
| JP | 2000-050539 | | 2/2000 | |
| JP | 2000050539 A | * | 2/2000 | ............... H02K 1/18 |
| JP | 2003274581 A | | 9/2003 | |
| JP | 2003319575 A | * | 11/2003 | ............... H02K 1/14 |
| WO | 02090603 A1 | | 11/2002 | |

OTHER PUBLICATIONS

Takashima, M.; Morito, N.; Honda, A.; Maeda, C.; "Nonoriented electrical steel sheet with low iron loss for high-efficiency motor cores" IEEE Transactions on Magnetics, vol. 35, Issue 1, Part 2, Jan. 1999 pp. 557-561 Digital Object Identifier 10.1109/20.737481.*

(Continued)

*Primary Examiner* — Burton Mullins

(57) ABSTRACT

An electrical rotating machine including a stator core is provided. The stator core is formed of substantially sector-shaped sheet segments die-cut from electrical steel sheets and arranged in a circumferential direction of the stator core to form circular sheets which are stacked in an axial direction of the stator core. In the electrical rotating machine, end regions of the stator core are formed of stacked sheet segments die-cut from non-grain oriented steel sheets, and the other region of the stator core is formed of stacked sheet segments die-cut from grain oriented steel sheets.

6 Claims, 4 Drawing Sheets

(56) References Cited

OTHER PUBLICATIONS

Kataoka, JP 61-062334, English Translation Mar. 1995.*
Kazao, JP 2000-050539, English Translation, Feb. 2000.*
Yabumoto, JP2003-319575, English Translation, Nov. 2003.*
http://www.appropedia.org/Amorphous_Metal_Alloys.*
http://www.keytometals.com/Articles/Art101.htm.*
http://www.protolam.com/page7.html.*
European search report dated Jul. 2, 2010 for corresponding European application 05016434.2 lists the references above.

* cited by examiner

ROLLING DIRECTION

ROLLING DIRECTION

ELECTRICAL ROTATING MACHINE WITH LOCAL HEAT REDUCTION

CROSS REFERENCE TO RELATED APPLICATIONS

This application claims the foreign priority benefit under Title 35, United States Code, §119(a)-(d), of Japanese Patent Application No. 2004-253711, filed on Sep. 1, 2004 in the Japan Patent Office, the disclosure of which is herein incorporated by reference in its entirety.

BACKGROUND OF THE INVENTION

1. Field of the Invention

The present invention relates to an electrical rotating machine, and more specifically, to an improved electrical rotating machine in which a local rise of temperature in a stator core is reduced.

2. Description of the Related Art

Electrical steel sheets are die-cut into substantially sector shapes as shown in FIG. 2 and arranged in a circumferential direction to form circular sheets which are stacked in an axial direction to form a stator core of a large size electrical rotating machine.

In FIG. 2, a sheet segment in a substantially sector shape includes teeth 1 between which there is provided a slot 3 where a coil is inserted, and a yoke 2 which forms a peripheral part of the sheet segment.

As shown in FIG. 3, several to several dozens of electrical steel sheets area stacked to form a block 4 and a cooling duct 5 is provided between blocks 4 to cool down an inside of a large size electrical rotating machine. The coil 6 and rotator 7 illustrate the relative position of the teeth region.

Among electrical steel sheets used for a stator core in an electrical rotating machine are non-grain oriented steel sheets in which a direction of easy magnetization is random and grain oriented steel sheets in which a direction of easy magnetization is aligned with a rolling direction of a steel band.

To reduce iron losses, grain oriented steel sheets are used as steel sheets for an iron core and circumferential directions of segment sheets are aligned with a rolling direction of a steel band as shown in FIG. 2 so that magnetic flux in a circumferential direction of a yoke 2 passes in a direction of easy magnetization. Moreover, circumferential directions of sheet segments of non-grain oriented steel sheets are also aligned with a rolling direction of a steel band since magnetic flux tends to pass more easily in the rolling direction of the steel band.

In teeth of end regions of a stator core, local overheating of the stator core becomes a problem since magnetic flux comes in an axial direction as well as radial directions. Thus, in a stator core using grain oriented steel sheets, magnetic flux cannot easily pass compared with in a stator core using non-grain oriented steel sheets, in the teeth 1 where magnetic flux passes mainly in the radial directions, since a direction of easy magnetization is aligned with a circumferential direction, and accordingly high heat is generated caused by iron losses. Local overheating in a stator core may damage insulation and form short circuits, causing a burnout of the stator core.

Therefore, as a solution for preventing local overheating in teeth of end regions of a stator core, a slit 8 is provided to each of teeth 1 as shown in FIG. 4 to narrow a flow path of eddy current in each of the teeth 1 and reduce eddy current loss caused by axial magnetic flux. Moreover, blocks 4 in each of end regions of a stator core are formed in a stepped taper shape as shown in FIG. 5 to prevent magnetic flux from locally concentrating.

However, losses caused by radial magnetic flux also greatly contribute to heating upon high densities of radial magnetic flux in teeth. Therefore, it is effective to reduce losses caused by radial magnetic flux to prevent local overheating.

The prior art described above is disclosed in Japanese Patent Publications JP 2000-50539A and JP 63-217940A and The Institute of Electrical Engineers of Japan; "Improvements and Problems for Use of Silicone Steel Sheets", Technical Report of the Institute of Electrical Engineers of Japan, Part II, No. 85, in 1979.

SUMMARY OF THE INVENTION

It is an aspect of the present invention to solve a problem that local overheating occurs in teeth of end regions of a stator core of an electrical rotating machine.

In the present invention, only several sheet segments of each of end regions of a stator core of an electrical rotating machine are die-cut from non-grain oriented steel sheets, or from electrical steel sheets in such a manner that a radial direction is aligned with a rolling direction of the electrical steel sheets, and then stacked to form the stator core allowing magnetic flux to pass easily in teeth to reduce heat generation caused by magnetic flux in a radial direction and prevent local overheating in teeth.

A stator core according to the present invention can provide a highly reliable electrical rotating machine by preventing local overheating in teeth in end regions.

In one aspect of the present invention, there is provided an electrical rotating machine including a stator core which is formed of substantially sector-shaped sheet segments die-cut from electrical steel sheets and arranged in a circumferential direction of the stator core to form circular sheets which are stacked in an axial direction of the stator core. In the electrical rotating machine, end regions of the stator core are formed of stacked sheet segments die-cut from non-grain oriented steel sheets and the other region of the stator core is formed of stacked sheet segments die-cut from grain oriented steel sheets.

One or more slits may be formed in each of teeth in end regions of the stator core.

In another aspect of the present invention, there is provided an electrical rotating machine including a stator core which is formed of substantially sector-shaped sheet segments die-cut from electrical steel sheets and arranged in a circumferential direction of the stator core to form circular sheets which are stacked in an axial direction of the stator core. In the electrical rotating machine, end regions of the stator core are formed of stacked sheet segments die-cut from electrical steel sheets in such a manner that a radial direction of each sheet segment is aligned with a rolling direction of the electrical steel sheets.

One or more slits may be formed in each of teeth in end regions of the stator core.

An electrical rotating machine according to the present invention includes a stator core which is formed of substantially sector-shaped sheet segments die-cut from electrical steel sheets and arranged in a circumferential direction of the stator core to form circular sheets which are stacked in an axial direction of the stator core. One or more slits are formed in each of teeth in end regions of the stator core. In the electrical rotating machine, the end regions of the stator core are formed of stacked sheet segments die-cut from non-grain oriented steel sheets, and the other region of the stator core is formed of stacked sheet segments die-cut from grain oriented steel sheets.

An electrical rotating machine according to the present invention includes a stator core which is formed of substantially sector-shaped sheet segments die-cut from electrical steel sheets and arranged in a circumferential direction of the stator core to form circular sheets which are stacked in an axial direction of the stator core. One or more slits are formed in each of teeth in end regions of the stator core. In the electrical rotating machine, the end regions of the stator core are formed of stacked sheet segments die-cut from electrical steel sheets in such a manner that a radial direction of each sheet segment is aligned with a rolling direction of the electrical steel sheets.

An electrical rotating machine according to the present invention includes a stator core which is formed of substantially sector-shaped sheet segments die-cut from electrical steel sheets and arranged in a circumferential direction of the stator core to form circular sheets which are stacked in an axial direction of the stator core. A stepped tapered portion is formed in each of end regions of the stator core. In the electrical rotating machine, the end regions of the stator core are formed of stacked sheet segments die-cut from non-grain oriented steel sheets, and the other region of the stator core is formed of stacked sheet segments die-cut from grain oriented steel sheets.

One or more slits may be formed in each of teeth of the sheet segments die-cut from the non-grain oriented steel sheet.

An electrical rotating machine according to the present invention includes a stator core which is formed of substantially sector-shaped sheet segments die-cut from electrical steel sheets and arranged in a circumferential direction of the stator core to form circular sheets which are stacked in an axial direction of the stator core. A stepped tapered portion is formed in each of end regions of the stator core. In the electrical rotating machine, the end regions of the stator core are formed of stacked sheet segments die-cut from electrical steel sheets in such a manner that a radial direction of each sheet segment is aligned with a rolling direction of the electrical steel sheets.

One or more slits may be formed in each of teeth of the stacked sheet segments die-cut from the electrical steel sheets in such a manner that the radial direction of each sheet segment is aligned with the rolling direction.

DESCRIPTION OF THE EXEMPLARY EMBODIMENTS

Here, embodiments of the present invention will be described by giving examples.

First Embodiment

Figure 1:
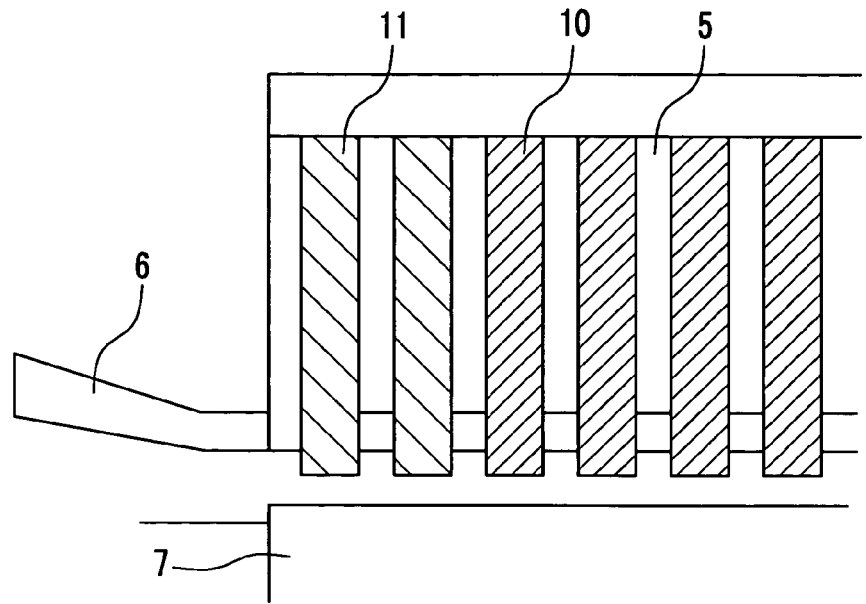
FIG. 1 is a partial cross-sectional view illustrating a first embodiment of an electrical rotating machine according to the present invention.

FIG. 1 illustrates a first embodiment of an electrical rotating machine according to the present invention. In an example shown in FIG. 1, only two blocks 11 in each of end regions of a stator core (that is, four blocks in total on the both ends) are comprised of stacked non-grain oriented steel sheets, while blocks 10 in the other region of the stator core are comprised of stacked grain oriented steel sheets.

Figure 2:
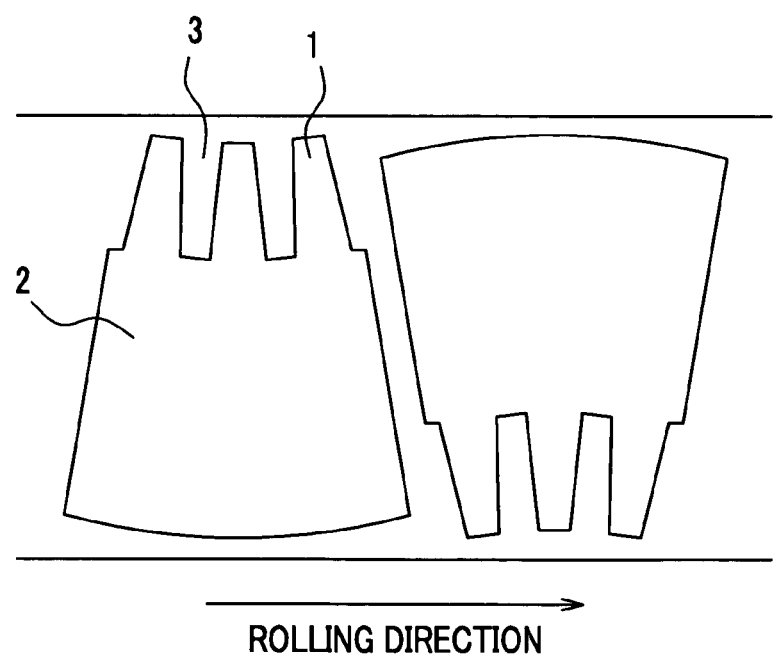
FIG. 2 is a diagram illustrating die-cutting of sheet segments of a stator core from a steel band, and a rolling direction of the steel band.
Figure 3:
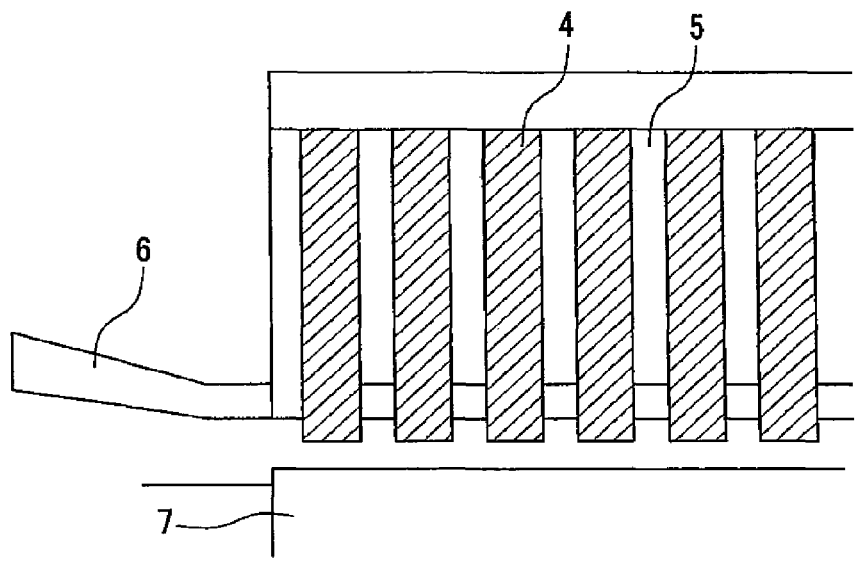
FIG. 3 is a partial cross-sectional view of a stator core as viewed from a circumferential direction.

In a block of grain oriented steel sheets which is comprised of sheet segments whose circumferential directions are aligned with a rolling direction as shown in FIG. 2, it is difficult for magnetic flux to pass in teeth 1 while it is easy for magnetic flux to pass in a yoke 2.

In the present embodiment, non-grain oriented steel sheets, in which it is easier for magnetic flux to pass compared with in a direction perpendicular to a rolling direction of grain oriented steel sheets, are used for the two blocks in each of the end regions of the stator core to reduce heat generation in the teeth 1 and prevent local overheating in the end regions of the stator core.

When non-grain oriented steel sheets are used, iron loss increases since it is less easy for magnetic flux to pass in a yoke 2 of non-grain oriented steel sheets compared with in a rolling direction of grain oriented steel sheets, but overall increase of iron loss is kept low because non-grain oriented steel sheets are used only for a several steel sheets stacked in the end regions.

Figure 6:
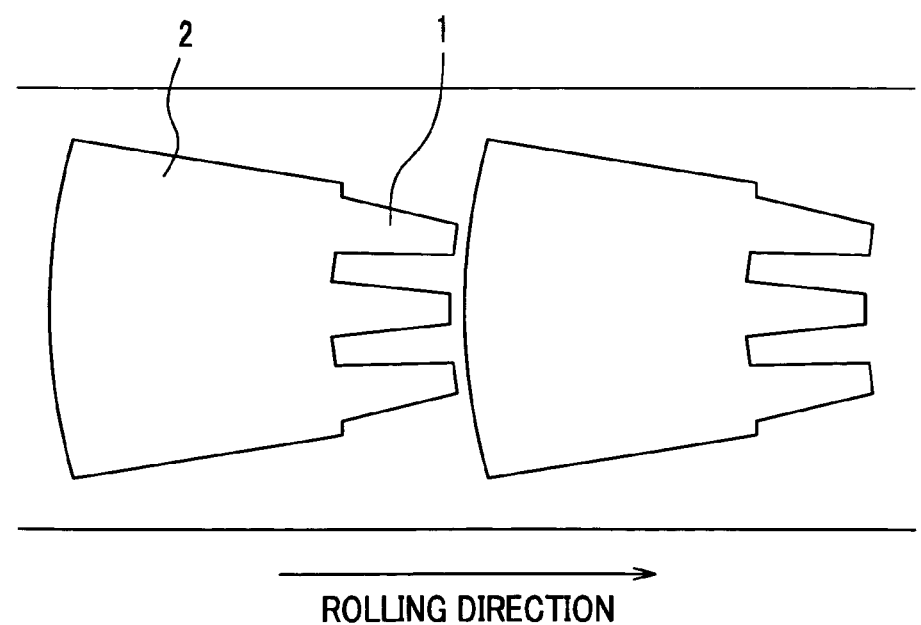
FIG. 6 is a diagram illustrating die-cutting of sheet segments of a stator core according to an exemplary embodiment of the present invention.

The sheet segments may be die-cut from non-grain oriented steel sheets in a direction shown in FIG. 2. However, when putting a priority on reducing heat generation in teeth 1, it is better to align a radial direction with a rolling direction as shown in FIG. 6 since how easily magnetic flux passes is different between a rolling direction and a direction perpendicular to the rolling direction even in a non-grain steel sheet.

Figure 4:
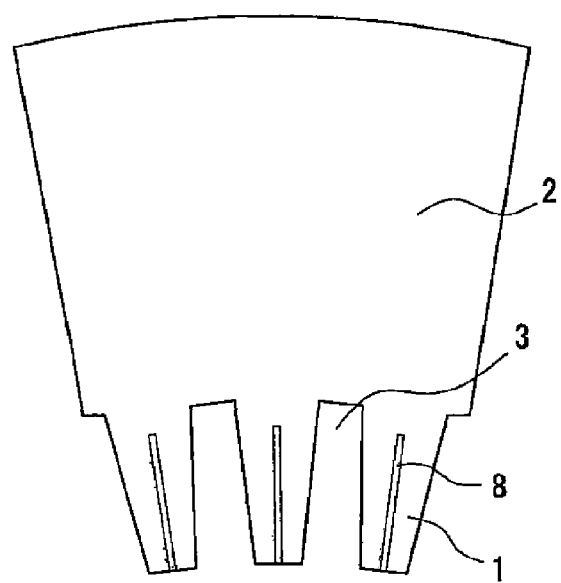
FIG. 4 is a diagram illustrating that a slit is provided to each of teeth of a stator core.
Figure 5:
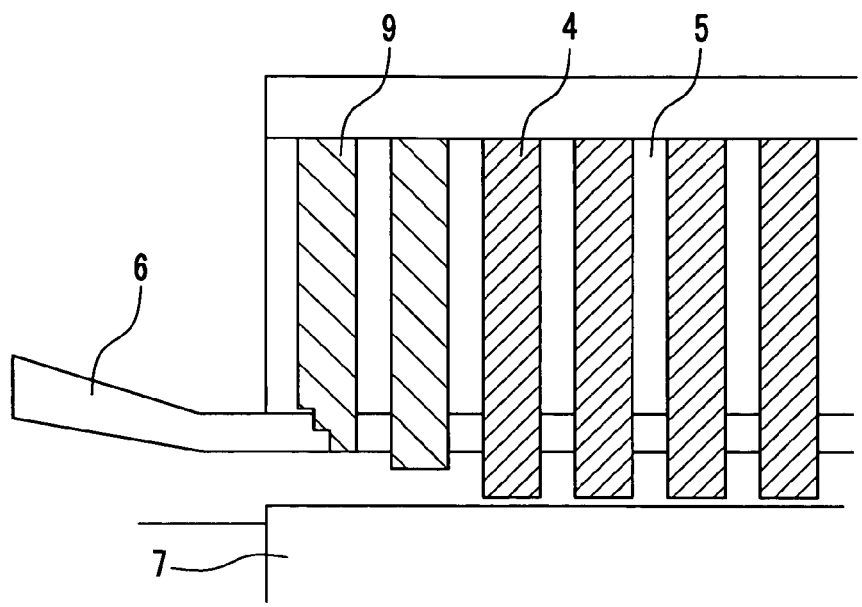
FIG. 5 is a partial cross-sectional view illustrating a stepped tapered portion in an end region of a stator core.

It is possible to reduce heat generation more by providing a slit to each of teeth of the sheet segment die-cut from non-grain oriented steel sheets as shown in FIG. 4 and reducing eddy current caused by axial magnetic flux.

It is possible to change the number of stacked sheets to achieve a desired effect, depending on for example a configuration of a power generator though two blocks are assumed in this example.

Second Embodiment

Figure 7:
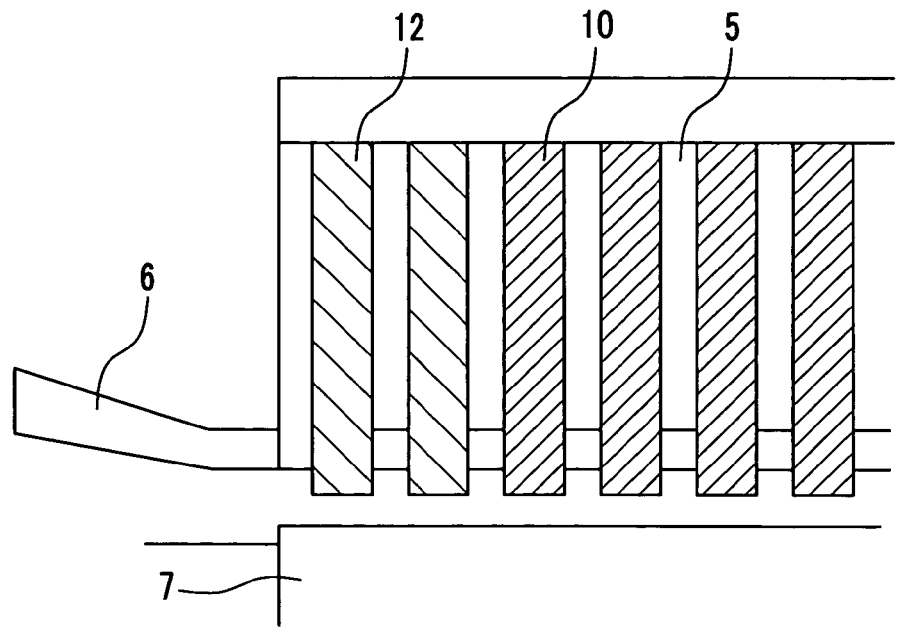
FIG. 7 is a partial cross-sectional view illustrating a second embodiment of an electrical rotating machine according to the present invention.

FIG. 7 illustrates a second embodiment of an electrical rotating machine according to the present invention. In an example shown in FIG. 7, only two blocks 12 in each of end regions of a stator core (that is, four blocks in total on the both ends) are comprised of stacked grain oriented steel sheets using sheet segments which are die-cut in such a manner that a radial direction is aligned with a rolling direction of the steel sheet as shown in FIG. 6, while blocks 10 in the other region of the stator core are configured of stacked grain oriented steel sheets.

In a block 10 of grain oriented steel sheets comprised of sheet segments whose circumferential directions are aligned with a rolling direction of the steel sheet as shown in FIG. 2, it is difficult for magnetic flux to pass in teeth 1 while it is easy for magnetic flux to pass in a yoke 2. In the present embodiment, teeth of the sheet segments of the two blocks in each of the end regions of the stator core are aligned with a rolling direction in which magnetic flux easily passes to reduce heat generation in the teeth 1 and prevent local overheating in the end regions of the stator core.

When grain oriented steel sheets are used, Iron loss increases since it is less easy for magnetic flux to pass in a yoke 2 where magnetic flux passes in a circumferential direction when a radial direction of the sheet segment is aligned with a rolling direction of grain oriented steel sheets. However, overall increase of iron loss is kept low because grain oriented steel sheets, whose radial directions are aligned with a rolling direction, are used only for a several steel sheets stacked in each of end regions.

Third Embodiment

Figure 8:
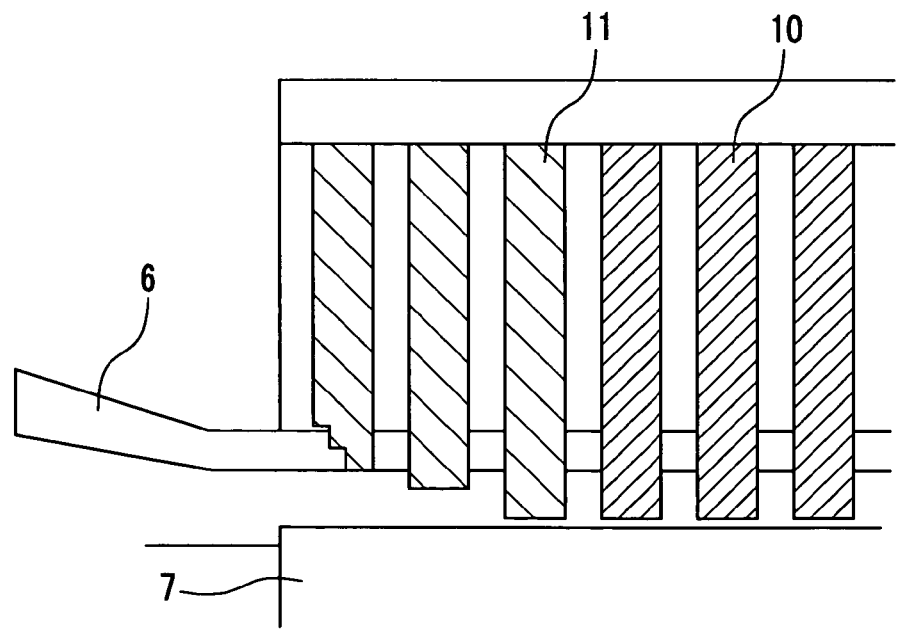
FIG. 8 is a partial cross-sectional view illustrating a third embodiment of an electrical rotating machine according to the present invention.

FIG. 8 illustrates a third embodiment of an electrical rotating machine according to the present invention. In an example shown in FIG. 8, only three blocks 11 in each of end regions of a stator core having a stepped taper formed at its end are comprised of stacked non-grain oriented steel sheets, while blocks 10 in the other region of the stator core are comprised of stacked grain oriented steel sheets.

In a block 10 of grain oriented steel sheets comprised of sheet segments whose circumferential directions are aligned with a rolling direction of the steel sheet as shown in FIG. 2, it is difficult for magnetic flux to pass in teeth 1 while it is easy for magnetic flux to pass in a yoke 2. In the present embodiment, non-grain oriented steel sheets, in which it is easier for magnetic flux to pass compared with in a direction perpendicular to a rolling direction of grain oriented steel sheets, are used for the blocks in the end regions, having the stepped taper formed at its end, to reduce heat generation in teeth 1 and prevent local overheating in the end regions of the stator core.

When non-grain oriented steel sheets are used, iron loss increases since it is less easy for magnetic flux to pass in a yoke 2 of non-grain oriented steel sheet compared with in a rolling direction of grain oriented steel sheets. However, overall increase of iron loss is kept low because non-grain oriented steel sheets are used only for steel sheets having a taper formed at its end.

While the described embodiments represent the preferred forms of the present invention, it is to be distinctly understood that the invention is not limited thereto but may be otherwise variously embodied within the spirit and scope of the following claims.

What is claimed is:

1. An electrical rotating machine comprising a stator core which is comprised of substantially sector-shaped sheet segments die-cut from electrical steel sheets and arranged in a circumferential direction of the stator core to form circular sheets which are stacked in an axial direction of the stator core, wherein
   end regions, in the axial direction, of the stator core are formed of stacked sheet segments die-cut from non-grain oriented steel sheets,
   the other region of the stator core is formed of stacked sheet segments die-cut from grain oriented steel sheets, and
   the end regions have a higher non-grain oriented steel content than the other region.

2. An electrical rotating machine according to claim 1, wherein one or more slits are formed in each of teeth in end regions of the stator core.

3. An electrical rotating machine comprising a stator core which is comprised of substantially sector-shaped sheet segments die-cut from electrical steel sheets and arranged in a circumferential direction of the stator core to form circular sheets which are stacked in an axial direction of the stator core, one or more slits being formed in each of teeth in end regions of the stator core, wherein
   end regions of the stator core are formed of stacked sheet segments die-cut from non-grain oriented steel sheets,
   the other region of the stator core is formed of stacked sheet segments die-cut from grain oriented steel sheets, and
   the end regions have a higher non-grain oriented steel content than the other region.

4. An electrical rotating machine comprising a stator core which is comprised of substantially sector-shaped sheet segments die-cut from electrical steel sheets and arranged in a circumferential direction of the stator core to form circular sheets which are stacked in an axial direction of the stator core, a stepped tapered portion being formed in each of end regions of the stator core, wherein
   end regions, in the axial direction, of the stator core are formed of stacked sheet segments die-cut from non-grain oriented steel sheets,
   the other region of the stator core is formed of stacked sheet segments die-cut from grain oriented steel sheets, and
   the end regions have a higher non-grain oriented steel content than the other region.

5. An electrical rotating machine according to claim 4, wherein one or more slits are formed in each of teeth of the sheet segments die-cut from the non-grain oriented steel sheet.

6. An electrical rotating machine comprising a stator core which is comprised of substantially sector-shaped sheet segments die-cut from electrical steel sheets and arranged in a circumferential direction of the stator core to form circular sheets which are stacked in an axial direction of the stator core, wherein
   end regions, in the axial direction, of the stator core are formed of stacked sheet segments die-cut from non-grain oriented steel sheets, and
   the other region of the stator core is formed of stacked sheet segments die-cut from grain oriented steel sheets.

\* \* \* \* \*